G. D. POGUE.
LUBRICATING MECHANISM FOR PISTON MACHINES.
APPLICATION FILED MAY 4, 1916.
1,254,535.
Patented Jan. 22, 1918.
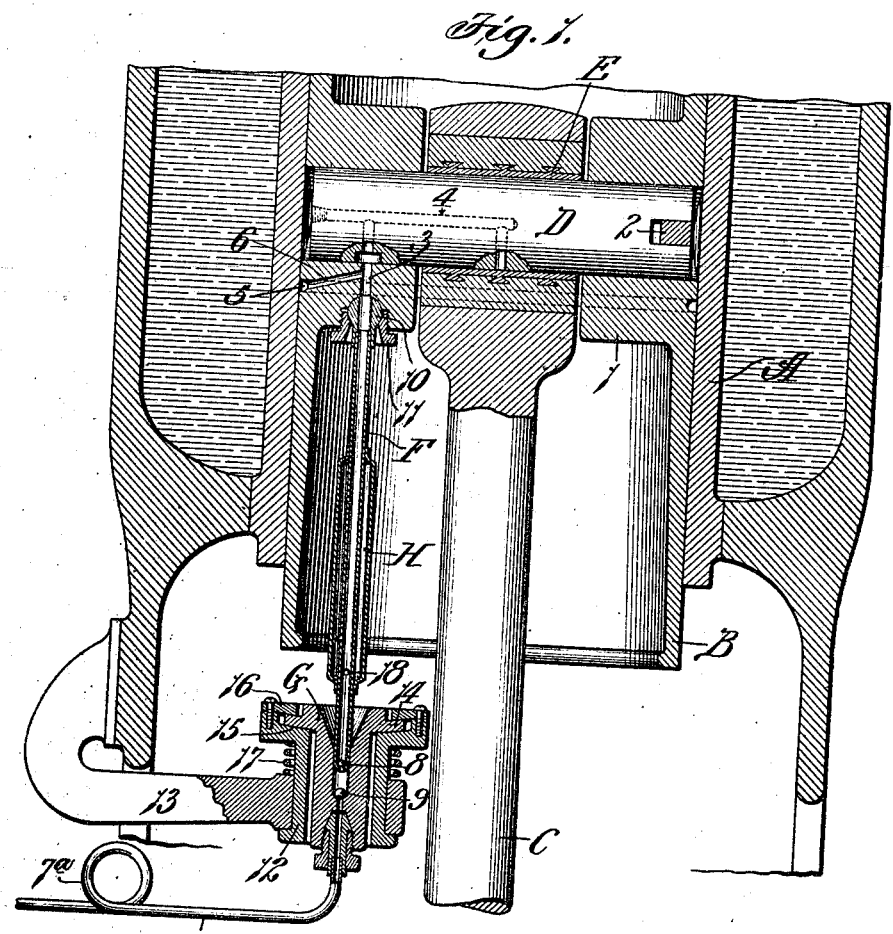
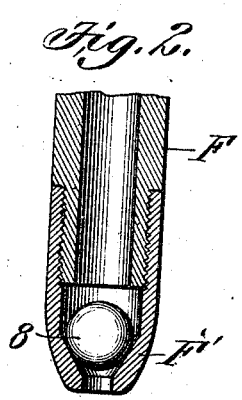
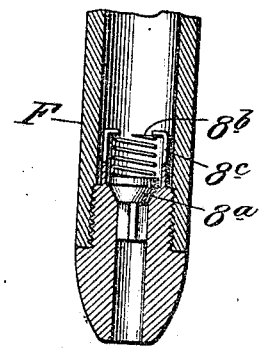
Inventor,
George D. Pogue.
By Bakewell & Shure Attys.

UNITED STATES PATENT OFFICE.

GEORGE D. POGUE, OF ST. LOUIS, MISSOURI.

LUBRICATING MECHANISM FOR PISTON-MACHINES.

1,254,535.  Specification of Letters Patent.  Patented Jan. 22, 1918.

Application filed May 4, 1916. Serial No. 95,380.

*To all whom it may concern:*

Be it known that I, GEORGE D. POGUE, a citizen of the United States, residing at St. Louis, Missouri, have invented a certain new and useful Improvement in Lubricating Mechanisms for Piston-Machines, of which the following is a full, clear, and exact description, such as will enable others skilled in the art to which it appertains to make and use the same.

This invention relates to machines of the type that comprise a reciprocating piston and a connecting rod which is pivotally connected to the piston by means of a member generally termed a piston pin.

The main object of my invention is to provide an efficient means for lubricating the piston pin bearing of a piston machine or engine.

Another object is to provide a lubricating mechanism of the character described which is so constructed that the lubricating medium will be supplied practically continuously to the piston pin bearing, and if desired, to the walls of the cylinder in which the piston moves when the machine is in operation.

Another object is to provide a lubricating mechanism of the character referred to that comprises an oil conduit or tubular-shaped member carried by the piston and arranged in such a manner that the lower end of same dips into an oil reservoir or container when the piston is in operation, and thus causes oil to be forced upwardly through said conduit to a bearing or surface which it is desired to keep thoroughly lubricated.

And still another object is to provide a lubricating mechanism of the character just referred to in which the tubular-shaped member on the piston and the coöperating oil reservoir are so constructed and arranged that any slight inaccuracies in longitudinal alinement of said parts or any temporary stoppage or diminution in the flow of the oil through said tubular-shaped member due, for instance, to low temperatures will not permanently affect the operation of the mechanism or cause the parts of same to be broken or bent out of shape. Other objects and desirable features of my invention will be hereinafter pointed out.

Figure 1 is a vertical sectional view of a portion of a piston machine equipped with a lubricating mechanism constructed in accordance with my invention.

Fig. 2 is an enlarged vertical sectional view of the lower end portion of the oil conduit or tubular-shaped member on the piston; and Fig. 3 is a vertical sectional view of an oil conduit or tubular-shaped member of slightly different form.

Referring to the drawings which illustrate the preferred form of my invention, A designates a cylinder, B designates a piston that is reciprocatingly mounted in said cylinder, and C designates the connecting rod that actuates said piston. The piston and connecting rod are pivotally connected together by a piston pin D which may either be connected to the piston and arranged in a bearing on the connecting rod or connected to the connecting rod and arranged in bearings on the piston. In the machine herein shown the piston pin D is mounted freely in a bearing E on the connecting rod, and the end portions of said piston pin are supported by lugs 1 on the piston, the piston pin being secured to the piston in such a manner that it cannot turn or rotate, such, for example, as by means of a cross key 2.

My invention consists in a novel means for lubricating the piston pin bearing or other bearings of an internal combustion engine, compressor or other machine, and in the preferred form of my invention herein shown said means consists of an oil conduit or tubular-shaped member F carried by the piston D and arranged in such a manner that the lower end of same will project into an oil well or reservoir G each time the piston reaches the lower end of its stroke, and thus cause lubricating oil to be forced upwardly through the member F to an oil-distributing duct or ducts that lead to the piston pin bearing E, or to any other surface or surfaces which it is desired to keep thoroughly lubricated.

In a machine of the type shown herein, wherein the piston pin bearing is carried by the connecting rod, the upper end of the tubular-shaped member F communicates with an oil duct 3 in the piston, and said oil duct 3 communicates with an oil duct 4 in the piston pin D that leads to the piston pin bearing, as shown in broken and full lines in Fig. 1. If it is desired to lubricate the inner walls of the cylinder A, the piston B can be provided in its outer surface with an annular oil groove 5 that is connected by means of a branch duct 6 with the oil duct 3 in the piston. Lubricating oil is supplied to the oil reservoir G by means of an oil supply pipe 7, so as to keep said reservoir filled, or substantially filled, with oil when the machine is in operation. Said oil reservoir is arranged in longitudinal alinement with the tubular-shaped member F on the piston, and the lower end of said member F and the mouth or upper end of said reservoir are so formed that the member F will be guided properly into the reservoir when the piston is in operation, the lower end of the tube F being open, so that the oil will be forced upwardly through same by the plunger-like action of the tube F in the oil reservoir C. A check valve 8 is arranged in the lower end of the oil tube F, so as to prevent the oil that enters said tube from escaping through the opening in the lower end of same when said tube moves upwardly out of the oil reservoir C, and if desired, a check valve 9 can be arranged in the oil reservoir, so as to prevent any back flow through the oil supply pipe 7 during the brief interval when the oil tube F is entering said reservoir. Any suitable check valve may be used for the purpose mentioned, either ball checks, as shown in Figs. 1 and 2, or spring-actuated check valves. In Fig. 3 I have illustrated a different type of check valve 8$^a$ that may be arranged in the lower end of the oil tube F, which valve is normally held seated by means of a spring 8$^b$ arranged between the valve and stops 8$^c$ on the valve cage. The oil tube or conduit F is preferably connected to the piston B in such a manner that it can move with relation to the piston, so as to adjust itself automatically to the oil reservoir G, in case said parts are not in exactly longitudinal alinement, and thus prevent said parts from being bent or broken. The oil reservoir G is also preferably constructed in such a manner that it can move laterally, and thus compensate for any slight inaccuracies in longitudinal alinement of the oil tube and oil reservoir. In the form of my invention herein illustrated the upper end of the oil tube F is connected to the piston by a ball and socket joint, the ball member 10 of the joint being carried by said tube, and the socket member of the joint being formed partly in one of the lugs 1 on the piston and in a removable retaining device 11 in said lug provided with a concaved seat. The oil reservoir G is carried by a sleeve 12 supported by a stationary arm 13 or other suitable member on the cylinder or some other stationary part of the machine, and said reservoir is mounted in said sleeve in such a manner that it will be free to move laterally or at right angles to the path of movement of the tube F. In the structure herein shown the oil reservoir G is provided adjacent its upper end with a flange 14 whose underside is convexed so that it will rest on a concaved surface 15 on the sleeve 12 that is generated from the ball and socket joint which joins the oil tube F to the piston, but it will of course be obvious that these coöperating surfaces could be flat without departing from the spirit of my invention. The oil reservoir G is held in position in the sleeve 12 by means of a plate 16 on said sleeve that laps over the top face of the flange 14 on the oil reservoir, and thus holds said flange on the concaved seat in the sleeve 12.

In order that the oil tube and its coöperating oil reservoir will not be unduly strained, in case the oil becomes temporarily sluggish, due to low temperature or other causes, or in case the oil fails to escape from the oil-distributing ducts at as fast a rate as the oil is being supplied to the oil tube F, I have mounted the sleeve 12 on a spring 17 that holds said sleeve in a certain position under normal conditions and which permits said sleeve to move downwardly under abnormal conditions, said spring being arranged between the upper side of the arm 13 and a portion on the sleeve that projects laterally over said spring. The oil supply pipe 7 that is connected to the lower end of the oil reservoir G is provided with a coil 7$^a$ that imparts sufficient flexibility to said pipe to provide for the vertical movement under abnormal conditions of the sleeve 12 that carries the oil reservoir, and also to permit said oil reservoir to move laterally in said sleeve. If desired, an air chamber H can be combined with the oil tube F, so as to prevent the pressure in said tube from becoming excessive and also to cause the intermittent or pulsating flow of the oil through said tube to be converted into substantially a continuous flow, said air chamber H being of cylindrical form, or of any other desired form, and being connected with the interior of the oil tube by one or more orifices 18 in said tube, as shown in Fig. 1. The particular construction of the oil tube is immaterial, but I prefer to form the lower end portion of said tube from a removable nozzle F' that forms a seat for the check valve in said tube and whose outer surface is tapered slightly, as shown in Figs. 2 and 3, so that it will be guided properly into the oil reservoir.

When the machine is in operation a certain amount of oil will be forced into the lower end of the oil tube F, each time said oil tube dips into the oil reservoir G, the oil rising gradually in said tube until it reaches the distributing ducts in the piston and piston pin, and thereafter continuing to flow through said ducts, so long as the machine continues in operation, the air that is trapped in the air chamber H by the oil that enters said chamber through the orifice 18 causing sufficient pressure to be exerted on the oil in the oil tube F to produce practically a continuous flow of oil to the parts being lubricated, and also preventing an excessive pressure being created in the oil tube. A lubricating mechanism of the character described insures a sufficient supply of oil to the piston pin bearing to keep said bearing adequately lubricated, and if the piston is provided in its outer surface with an annular groove that communicates with the oil tube F, oil will be distributed around the entire circumference of the cylinder bore, thus insuring adequate lubrication of the cylinder without resorting to the use of an annular groove in the cylinder bore, which, of course, would preclude mounting a wiper ring on the piston. The mechanism is so constructed that the stationary member, or, in other words, the oil reservoir, is free to move laterally with reference to the movement of the piston in such a manner that any lack of proper alinement between the moving and stationary parts is compensated for; the oil tube is connected to the piston in such a manner that said tube will be free to adjust itself to any slight mal-alinement of the parts, and thus avoid bending or damage to the oil tube; the oil tube and its coöperating oil reservoir are so designed that the oil tube will be guided properly and the parts will not be subjected to undue lateral strains, and the oil reservoir is so mounted that neither the stationary nor the movable parts of the structure will be strained if the oil becomes temporarily sluggish, due to low temperature or other causes, or if the oil should inadvertently be fed to the oil tube F at a higher rate than it can flow through the distributing ducts in the piston and piston pin. The check valves in the oil tube and in the oil reservoir prevent oil from leaking from the oil tube when said elements are not in contact and prevent any back flow through the supply line when the oil tube enters the oil reservoir. And still another desirable feature of a lubricating mechanism of the structure above described is that it comprises an air chamber that causes the intermittent or pulsating flow, produced by the plunger-like action of the oil tube, to be converted into practically a continuous flow, said air chamber also preventing building up of excessive pressures in the oil tube, due to the comparatively rapid displacement of the oil when said tube enters the oil reservoir.

Having thus described my invention, what I claim, and desire to secure by Letters Patent, is:

1. In a machine of the character described, a reciprocating piston, an oil conduit that travels with the piston, and an oil container mounted on a stationary part of the machine and provided with an opening into which one end of said oil conduit moves when the piston is in operation, said container being normally separated from the oil conduit and the opening in said container being so proportioned with relation to the exterior of said conduit that the movement of the conduit into said container causes oil to be forced through said conduit.

2. In a machine of the character described, a reciprocating piston, an oil conduit carried by said piston, an oil container carried by a stationary part of the machine and provided with an opening into which one end of said oil conduit moves when the piston is in operation, the oil conduit being normally separated from said container and being so proportioned that it fits the opening in the container sufficiently close to practically prevent leakage through said opening when the conduit enters said container, thereby causing the oil in said container to be forced through said conduit, and means for preventing the oil from escaping through the oil-receiving opening in the conduit when the conduit is withdrawn from the container.

3. In a machine of the character described, a reciprocating piston, an oil conduit that travels with said piston, an oil holder normally separated from the oil conduit and having an opening into which one end of the oil conduit moves when the piston is in operation so as to cause oil to be forced through said conduit, a supply pipe leading to said oil holder, and means for preventing the oil in said holder from being forced backwardly through said supply pipe when said oil conduit moves into said holder.

4. In a machine of the character described, a reciprocating piston, an oil conduit that travels with said piston, an oil holder normally separated from the oil conduit and having an opening into which one end of said conduit moves when the piston is in operation so as to cause oil to be forced into said conduit, a supply pipe leading to said oil holder, means for preventing oil from being forced backwardly through said supply pipe when said oil conduit enters said holder, and means for preventing the oil from escaping through the receiving opening of the oil conduit when said conduit is withdrawn from said oil holder.

5. In a machine of the character described, a reciprocating piston, an oil conduit that travels with said piston, an oil container normally separated from the oil conduit and having an opening into which one end of the conduit moves when the piston is in operation, means for supplying oil to said container, and check valves for said oil container and for the receiving opening in said oil conduit.

6. In a machine of the character described, a piston, an oil conduit connected at one end to said piston, and an oil container that has a sliding fit with the free end of said conduit when the piston is in operation, said oil conduit being mounted in such a manner that it will adjust itself automatically to said oil container.

7. In a machine of the character described, a piston, an oil conduit carried by said piston, and an oil container in which said conduit moves when the piston is in operation, said oil container being so constructed that it can adjust itself automatically to said oil conduit when the piston is in operation.

8. In a machine of the character described, a reciprocating piston, and an oil conduit on said piston whose free end dips into a supply of oil when the piston is in operation, said oil conduit being connected to the piston in such a manner that the free end of same can move in any direction relatively to the piston.

9. In a machine of the character described, a reciprocating piston, an oil conduit carried by said piston, and an oil container into which the free end of said conduit projects when the piston is in operation, said container being mounted in such a manner that it can move at an angle to the path of travel of the piston.

10. An oil supply mechanism for the purpose described, comprising a reciprocating element, and a stationary element that is adapted to receive said reciprocating element, said elements being so constructed and arranged that they can adjust themselves automatically to each other to compensate for any slight inaccuracies in longitudinal alinement.

11. In a machine of the character described, a reciprocating piston, a connecting rod, an oil conduit separate and distinct from said connecting rod and arranged at one side of same, means for causing oil to be forced through said conduit when the piston is in operation, and a ball and socket joint for connecting said oil conduit to the piston.

12. In a machine of the character described, a reciprocating piston, an oil tube carried by the piston, and an oil container into which the free end of said oil tube projects when the piston is in operation, said oil container being mounted in such a manner that it can move laterally with relation to the path of travel of said oil tube.

13. In a machine of the character described, a reciprocating piston, an oil tube carried by said piston, and a yieldingly mounted oil container into which the free end of said oil tube projects when the piston is in operation.

14. In a machine of the character described, a reciprocating piston, an oil tube carried by said piston, and an oil container into which the free end of said oil tube moves when the piston is in operation, said oil container being so constructed and arranged that it can move slightly in a direction parallel to the path of travel of the piston and at an angle to the path of travel of the piston under certain conditions.

15. In a machine of the character described, a reciprocating piston, an oil tube carried by the piston, a coöperating oil container for receiving the free end of said tube, and a resilient supporting means for said oil container, said container being so constructed that it can move laterally with relation to the path of travel of said oil tube.

16. In a machine of the character described, a reciprocating piston, an oil tube carried by the piston, a coöperating oil container into which the free end of said oil container moves when the piston is in operation, a supporting element for said oil container, and a resilient device interposed between said supporting element and said oil container.

17. In a machine of the character described, a reciprocating piston, an oil tube pivotally connected to said piston and provided with an air chamber that communicates with the interior of said tube, a laterally-movable oil container into which the free end of said oil tube moves when the piston is in operation, and a resilient supporting means for said oil container.

18. In a machine of the character described, a reciprocating piston, an oil tube connected at one end to said piston, an oil container into which the free end of said oil tube projects when the piston has almost completed its stroke in one direction, said tube fitting said container sufficiently close to substantially prevent leakage between said tube and container during that portion of the piston stroke when the oil tube is in said container, and means whereby said oil container can move slightly either longitudinally or laterally without causing said oil tube to bind or cramp in said container.

In testimony whereof I hereunto affix my signature in the presence of two witnesses, this first day of May, 1916.

GEORGE D. POGUE.

Witnesses:
WELLS L. CHURCH,
GEORGE BAKEWELL.